United States Patent Office 3,627,524
Patented Dec. 14, 1971

3,627,524
CHLORINE SUBSTITUTED 9-VINYLCARBAZOLE PHOTOCONDUCTOR
Kikuo Kinjo, Tokyo, Teruo Yamanouchi, Fujisawa, and Eiichi Kondo, Hiroshi Matsuno, and Katsuhiko Nishide, Tokyo, Japan, assignors to Canon Kabushiki Kaisha, Tokyo, Japan
No Drawing. Filed July 13, 1970, Ser. No. 54,561
Claims priority application Japan, July 18, 1969, 44/56,806; Feb. 4, 1970, 45/9,837
Int. Cl. H01l *13/00;* C08f *5/00;* G03g *5/00*
U.S. Cl. 96—1.5                                         28 Claims

ABSTRACT OF THE DISCLOSURE

An electrophotographic photosensitive material comprises a polymer (homopolymer or copolymer) containing a chlorine substituted 9-vinylcarbazole repeating unit.

---

This invention relates to electrophotographic photosensitive material. Heretofore, there have been known various organic photoconductive material used as electrophotosensitive material, and some of them have a fairly high photosensitivity. However, at present organic photoconductive materials are hardly used in practical application. Organic photoconductive materials possess various advantages over inorganic photoconductive materials. Organic photoconductive material will be widely and usefully employed in the field of electrophotography and photosensitive material. For example, it is possible only by using organic photoconductive materials to obtain transparent and flexible photosensitive film of light weight and easy handling. Organic photoconductive materials have excellent characteristics such as film shapability, surface smoothness, and selectivity of charging polarity when used in electrophotographic reproduction process, which cannot be expected in inorganic photoconductive materials. In spite of such excellent various characteristics of organic photoconductive materials, they have not yet been widely used in electrophotographic reproduction field since photosensitivity thereof is remarkably low, for example, the photosensitivity is far lower than that of selenium and zinc oxide.

An object of this invention is to provide a highly sensitive organic photosensitive material for electrophotography which can increase commercial value of electrophotographic photosensitive materials.

Another object of this invention is to provide a process for preparing novel organic photoconductive materials.

A further object of this invention is to provide a novel means for synthesizing organic photoconductive materials.

Still another object of this invention is to provide a stable organic photoconductive material free from deterioration of photoconductivity during long storage.

Still further object of this invention is to provide organic photoconductive materials of easy handling in production.

Still another object of this invention is to provide electrophotographic photosensitive material having photosensitivity similar to or higher than that of inorganic photoconductive materials by applying various sensitizing methods.

Still another object of this invention is to provide electrophotographic photosensitive material having photosensitivity similar to or higher than that of inorganic photoconductive materials by applying various sensitizing methods.

Electrophotographic photosensitive material of this invention comprises a polymer having a chlorine substituted 9-vinylcarbazole repeating unit.

The polymer having a chlorine substituted 9-vinylcarbazole repeating unit may be obtained by chlorinating poly-9-vinylcarbazole, or by polymerizing a chlorine substituted 9-vinylcarbazole or copolymerizing a chlorine substituted 9-vinylcarbazole with the other monomer. Chlorine contents of chlorine substituted poly-9-vinylcarbazole obtained by chlorine substituted poly-9-vinylcarbazole may be widely varied and the photosensitivity and the spectrum absorption characteristics depend on the chlorine contents. Further, chlorine contents of chlorine substituted poly-9-vinylcarbazole obtained by homopolymerizing or copolymerizing a chlorine substituted 9-vinylcarbazole can be controlled mainly by preliminarily calculating the amount of chlorine on the basis of the known number of chlorine atom attached to the monomer, and further the chlorine substituted poly-9-vinylcarbazole thus obtained may be further chlorinated to adjust the chlorine contents to a desired amount.

Chlorine substituted poly-9-vinylcarbazole can be prepared by treating poly-9-vinylcarbazole with a chlorinating agent such as chlorine, sulfuryl chloride and the like, and the degree of chlorination can be optionally changed by changing the amount of chlorinating agent.

There is below detailed the condition for process of chlorination with sulfuryl chloride.

To a homogeneous solution of poly-9-vinylcarbazole in the selected media from the below-indicated table, sulfuryl chloride or the dilute solution thereof was dropwise added with stirring at room temperature or cooled temperature. The reaction was accomplished with stirring at room temperature or about 30° C., or when chlorine substitution degree was over 2.0 about 70° C. at maximum. The starting material and solvent must be used as anhydrously as possible and the reaction vessel was prevented from moisture.

The solvent was selected from the below-indicated table according to the desired chlorine substitution degree. While the adaptability of the solvents is due to the solubility of the product, it is impossible to remove the colour of the product by a purification procedure comprising a dissolution and precipitation when unsuitable solvent such as the class A indicated in the below table, which is used for high degree of chlorine substitution, was used, and the product was coloured yellow, insoluble.

TABLE

| Degree of chlorine substitution | Class | Example of solvent |
|---|---|---|
| Below 2 | A and B | Methylene chloride, 1,7-dichloroethane, sym-tetrachloroethane, benzene, chlorobenzene. |
| 2 to 4 | B | Chlorobenzene, dichlorobenzene. |

When under the above-mentioned condition, the reaction was carried out, the chlorine substitution was accomplished stoichiometrically corresponding with the amount of sulfuryl chloride. Therefore, the amount of sulfuryl chloride can be determined from the desired degree of chlorine substitution.

For example, chlorine substituted poly-9-vinylcarbazole or chlorine substituted 9-vinylcarbazole having one chlorine atom per one carbazole ring is desired, 1.0 mole of sulfuryl chloride per 1.0 mole of carbazole unit is used. However, when a higher degree of chlorination, particularly, 3 to 4 atoms per carbazole ring, a little excess of sulfuryl chloride is advantageously used due to reaction time and reaction temperature. Even in this case, when the reaction conditions are maintained constant, the reproducibility of degree of chlorine substitution is high. After completion of the reaction, the reaction mixture is poured into a large amount of polar solvent, preferably, methanol with vigorous stirring to precipitate the polymer. The precipitate is filtered, dissolved in a solvent of class A or B, poured into methanol again to precipitate. One to three cycles of dissolution and precipitation are usually sufficient. It is particularly preferable for electrophotography to pour a chlorobenzene solution into methanol.

In some cases, for example, in which economy is important, the polymer is not recovered as solid, but as a solution. For example, such solution is directly used as a coating solution by adding sensitizer, plasticizer and the like to the solution. In such a case where benzene or chlorobenzene is used an inert gas such as nitrogen is blown into the reaction solution during or after the reaction to remove hydrogen chloride and sulfur dioxide as a reaction by-product. During introduction of inert gas, the solution may be heated. In this case it is possible to control the concentration of the coating solution by distilling away the solvent at an appropriate temperature. However, since foaming often occurs at temperatures higher than the boiling point of the solvent, the control of concentration of coating solution is preferably effected by adjusting the amount of solvent used during the reaction. According to the above procedure, hydrogen chloride and sulfur dioxide are substantially removed. If a complete removal of them is desired, the benzene or chlorobenzene reaction solution is washed with water after completion of reaction and then dried on anhydrous sodium sulfate and anhydrous magnesium sulfate and the dehydrating agent is separated by centrifugal precipitation or filtration. The resulting solution can be used as a coating solution.

The following are examples of preparation of chlorine substituted poly-9-vinylcarbazole.

PREPARATION EXAMPLE 1

Poly-9-vinylcarbazole (Luvican M–170, trade name, supplied by Badische Anilin und Soda Fabrik) (4 g.) was dissolved in 200 ml. of dry methylene chloride in a three-necked flask equipped with a reflux condenser having a calcium chloride tube and a dropping funnel.

A solution of sulfuryl chloride in methylene chloride (20% by volume) was dropwise added to the poly-9-vinylcarbazole solution at 0° C. with stirring. After completion of the addition, reaction was carried out at temperatures shown in the following table for three hours. The reaction mixture was then poured into a large amout of methanol to precipitate the polymer and the polymer thus precipitated was throughly washed and dried.

| Experiment No. | Amount of 20% solution of $SO_2Cl_2$, ml. | Reaction temp.,° C. | Yield, g. |
|---|---|---|---|
| 1 | 2.57 | 0 | 4.1 |
| 2 | 5.40 | 20 | 4.2 |
| 3 | 10.77 | 20 | 4.5 |
| 4 | 21.54 | 30 | 5.2 |

The above mentioned chlorine substituted polyvinylcarbazole was precipitated again by a system of monochlorobenzene-methanol and purified.

The result of analysis was as follows:

| Experiment No. | Cl | N |
|---|---|---|
| 1 | 4.25 | 7.00 |
| 2 | 8.40 | 6.32 |
| 3 | 15.2 | 6.30 |
| 4 | 27.8 | 5.25 |

The contents of chlorine in the above-mentioned polymer almost correspond to the mole number of sulfuryl chloride used for this reaction.

A chlorine substituted poly-9-vinylcarbazole of high chlorine contents (particularly higher than 30% chlorine) can be obtained by using monochlorobenzene as solvent.

PREPARATION EXAMPLE 2

Four grams of poly-9-vinylcarbazole was dissolved in 200 ml. of monochlorobenzene and then 11.2 g. of sulfuryl chloride was added thereto with vigorous stirring at 0° C. The stirring was carried out at 70° C. for 6 hours and then the reaction mixture was poured into a large amount of methanol to precipitate the resulting polymer. The polymer thus precipitated was washed with an aqueous methanol and then methanol, and dried under reduced pressure. The resulting product was a white polymer soluble in monochlorobenzene. The yield was 6.8 g. and the analysis results in Cl: 42.5%, and N: 4.17%.

Following the above procedure using 9.0 g. of sulfuryl chloride instead of 11.2 g. of sulfuryl chloride, there was obtained 5.8 g. of white polymer material. The resulting product is soluble in monochlorobenzene, the analysis thereof results in Cl: 35.0% and N: 4.80%. The thus obtained chlorine substituted poly-9-vinylcarbazole each is soluble in a solvent, and does not degenerate for long period. The infrared absorption spectrum is measured in the film form deposited on rock salt. It is observed that the increase of chlorine content reduced the intensity of 720–740 cm.$^{-1}$ absorption band (named thereinafter A band), and raised the intensities of 790 cm.$^{-1}$ and 860 cm.$^{-1}$ absorption bands (named hereinafter B band). The sample having 24–30% of chlorine content results in the very weak A band and the strong B band. The samples having over 35% of chlorine content results in the remarkable change of 700–900 cm.$^{-1}$ absorption band form.

It was recognized that the chlorination mainly occurs sequentially at 3-position, 3-6-positions, 1,3,6-positions, and finally 1,3,6,8-positions in view of result of comparison with infrared spectra of 3-chloro carbazole, 3,6-dichloro carbazole, 1,3,6-trichloro carbazole and 1,3,6,8-tetrachloro carbazole.

PREPARATION EXAMPLE 3

Production of poly-3-chloro-9-vinylcarbazole

In a three necked flask equipped with a blowing tube having a capillary end, an agitator and a thermometer, poly-9-vinylcarbazole (trade name Luvican M–170) 20 gr. was dissolved into a mixture of pyridine 60 ml. and methylene chloride 500 ml., and with vigorously stirring cooled at −10° C., to the mixture, chlorine gas was gradually introduced. Then, the solution treated with chlorine gas was poured into methanol to deposit the precipitate polymer followed by dissolving the obtained polymer in chlorobenzene. The obtained polymer was reprecipitated from methanol to obtain a white polymer. The resultant was mainly composed of poly-3-chloro-9-vinylcarbazole from the infrared data. The chlorination process can be modified by initial treatment with sulfunyl chloride followed by the gradual introduction of chlorine gas. Such modification process enables one to raise the amount of chlorination.

In the production of polymer from chlorine substituted 9-vinylcarbazole, the control of chlorine content can be carried out by the amount of substituted chlorine in chlorinated 9-vinylcarbazole. In the use of monochlorinated, dichlorinated and trichlorinated 9-vinylcarbazoles, the polymerization was carried out on the combination of one or more kinds of the chlorinated 9-vinylcarbazoles. The other monomer can be copolymerized with vinylcarbazoles for control of chlorine number. Chlorine substituted compounds including various kinds of vinyl carbazoles can be prepared by roundabout methods of production and particular processes for a substituted position, substituted chlorine number and various compounds having various substituted position and chlorine number.

Below is mentioned the practical and economically produced compounds for polymerization; monochloro compounds such as 1-chloro-9-vinylcarbazole,
3-chloro-9-vinylcarbazole;
dichloro compounds such as
1,3-dichloro-9-vinylcarbazole,
1,6-dichloro-9-vinylcarbazole,
3,6-dichloro-9-vinylcarbazole;
trichloro compounds such as
1,3,6-trichloro-9-vinylcarbazole.

The chlorination procedure which can be replaced for the above-mentioned procedure can be accomplished by the introduction of a purified chlorine gas at very low velocity under the cautiously controlled condition, with vigorous stirring in a solution such as benzene and monochlorobenzene, or the addition of glacial acetic acid in amount of below 5% therein at low temperature.

There is below illustrated the process for the production of the polymer from chlorine substituted 9-vinylcarbazole. The starting material such as chlorine substituted 9-vinylcarbazole can be produced by various processes e.g.:

(1) reaction with acetylene in a presence of alkali catalyst according to Reppe synthesis for chlorine substituted carbazole, which was reported in for example Journal of Kogyo Kagaku, vol. 59, page 511 (1956), by Otsuka and Murahashi.

(2) a process comprising a reaction of alkali salt of chlorinated carbazole with ethylene oxide in an inert solvent such as xylene followed by a dehydration of the provided 9-ethylol carbazole, (3) a process comprising a halogenation of 9-ethylol carbazole or 9-β-chloroethyl carbazole followed by a dehydration or dehydrochlorination of the provided product.

The thus provided chlorine substituted 9-vinylcarbazole is polymerized under non-catalytic heating, in the presence of radical polymerization initiator or Lewis acid, or by photopolymerization. The below-mentioned example is referring to a process for the production of chlorine substituted 9-vinylacarbazole.

PREPARATION EXAMPLE 4

Production of 3-chloro-9-vinylcarbazole

Carbazole 20 gr. was dissolved in a mixture of pyridine 60 ml. and chloroform 60 ml. and thereto chlorine gas was introduced with vigorous stirring. When an absorbed amount of chlorine gas reached to 5 gr., the introduction was stopped. Then after stirring for about one hour, the reaction mixture was poured into dilute hydrochloric acid, and therefrom chloroform was discharged away. The precipitate was filtered and then recrystallized from methanol. The resultant was 3-chlorocarbazole 10 gr. the yield; about 42%, melting point; 197–200° C. (reference value 200° C.). The excess carbazole was collected from a residue insoluble in methanol. In an autoclave containing 100 ml., 3-chlorocarbazole 4.0 gr., powdered caustic potash 0.075 gr. and zinc oxide 0.025 gr. are shaken with cyclohexane 5 ml. Acetylene was introduced thereto and the reaction was carried out at 170° C.–180° C. for six hours (the initial pressure was 25 atms.). The reaction mitxure was poured into water after cooled and a discharge of acetylene, and the precipitate was filtered and recrystallized from n-hexane. The resultant was 3-chloro-9-vinylcarbazole 3.6 gr. yield; about 80%, melting point; 78° C.

Analysis.—Calculated (percent): C, 73.9; H, 4.39; N, 6.16; Cl, 15.6. Found (percent): C, 73.4; H, 4.20; N, 6.10; Cl, 15.2.

PREPARATION EXAMPLE 5

Production of 3,6-dichloro-9-vinylcarbazole

Carbazole 8.4 gr. was suspended in carbon disulfide, and then chlorine gas was introduced therein with vigorous stirring. The mixture was heated at 45° C. for further one hour for continuing the reaction. The hot reaction mixture was filtered and the provided crystalline was washed with carbon disulfide, and recrystallized from glacial acetic acid. The resultant was 3,6-dichlorocarbazole 6.1 gr., the yield; about 60%, M.P.; 204° C. (reference value 206° C.). 3,6-dichlorocarbazole 4.0 gr., powdered caustic potash 0.07 gr. and cyclohexane 5 ml. were held in an autoclave containing 100 ml., and thereto acetylene was introduced (the initial pressure was 25 atms.), and the reaction was carried out at 170° C. for six hours. The reaction mixture was poured into water after cooled and discharge of acetylene, and then the precipitate was filtered and recrystallized from n-hexane. The resultant was 3,6-dichloro-9-vinylcarbazole 3.5 gr., the yield; about 79%, M.P.; 125° C.

Analysis.—Calculated (percent): C, 64.0; H, 3.44; N, 5.35; Cl, 27.1. Found (percent): C, 64.3; H, 3.40 (3.44); N, 5.30; Cl, 26.7.

PREPARATION EXAMPLE 6

Production of poly-1,3-dichloro-9-vinylcarbazole

Poly-1,3-dichloro-9-vinylcarbazole was produced by the below illustrated sequential processes.

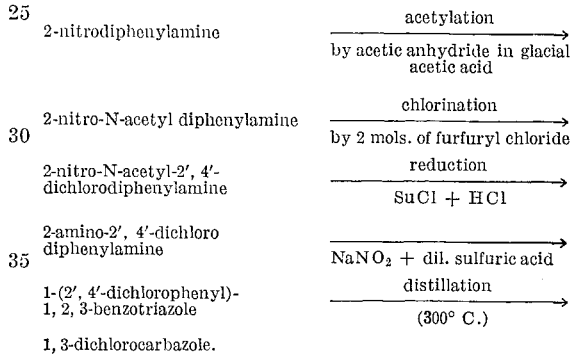

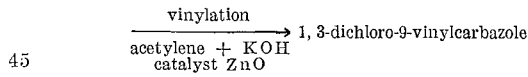

The provided 1,3-dichloro carbazole melt at 200° C. The process was followed by further procedures which are below illustrated. 1,3-dichlorocarbazole $$\xrightarrow[\text{acetylene + KOH}]{\text{vinylation}} \text{1,3-dichloro-9-vinylcarbazole}$$
$$\text{catalyst ZnO}$$

The thus obtained dichloro vinylcarbazole resulted in the analysis.

Calculated (percent): N, 5.35; Cl, 27.0. Found (percent): N, 5.28; C, 26.2.

The polymerization of 1,3-dichloro-9-vinylcarbazole was accomplished as follows.

1,3-dichloro-9-vinylcarbazole 2.0 g. was reacted in a solvent of 1,2-dichloroethane under nitrogen flow with benzoyl-N-peroxide at 80° C. for eight hours. The resultant was a white polymer.

There is below mentioned examples for illustrating a process for the production of chlorine substituted 9-vinylcarbazole polymer.

PREPARATION EXAMPLE 7

Production of poly-3-chloro-9-vinylcarbazole

Process (1)—In a three necked flask, 3-chloro-9-vinylcarbazole 3.9 gr. was dissolved into methylene chloride 10 ml. and nitrogen gas substituted for atmosphere. The mixture was cooled at −20° C. A drop of boric etherate trifluoride solution was added to the mixture with stirring. Immediately, it is observed that a temperature increased to initiate the polymerization. Concentrated ammonia water was added to the reaction mixture to quench the polymerization. The provided precipitate was dissolved into benzene and methanol was added thereto to recrystallize them. Such procedure was twice repeated. The resultant was a white polymer 2.5 gr., the yield; about 83%. The intrinsic viscosity in benzene was $[\eta]=0.06$.

*Process (2)*.—To a quartz tube in use for polmerization containing 3-chloro-9-vinylcarbazole 1.0 gr. in a solution of acetonitrile 4.0 ml., the irradiation of high pressure mercury lamp was applied. Methanol was added to the reaction mixture, and the provided precipitate was filtered followed by a recrystallization from benzene-methanol. The resultant was a white polymer 0.65 gr., the yield; about 65%. The intrinsic viscosity in benzene was $$[\eta]=0.10$$

PREPARATION EXAMPLE 8

Production of copolymer of 3-chloro-9-vinylcarbazole and 9-vinylcarbazole

A polymerization tube substituted with nitrogen contained 3-chloro-9-vinylcarbazole 0.5 gr. and 9-vinylcarbazole 1.0 gr., and then was heated at 100° C. for six hours. The reaction mixture was dissolved into chlorobenzene to precipitate the polymer from methanol. The resultant was a white polymer 1.3 gr. From analysis of nitrogen and chlorine, this product was confirmed as copolymer of chloro vinylcarbazole and vinylcarbazole.

PREPARATION EXAMPLE 9

Production of copolymer of 3-chlorocarbazole and styrene 3-chloro-9-vinylcarbazole 3.0 gr. and styrene 0.5 gr. were dissolved into methylene chloride. To the mixture, boric etherate trifluoride was added at −30° C. with vigorous stirring. Methanol was added to the reaction mixture followed by filtering the provided precipitate. The precipitate was recrystallized in benzene-methanol. Such procedure was twice repeated to result in a white polymer 2.0 gr. From the analysis of nitrogen, the product was recognized as a copolymer of chlorovinylcarbazole and styrene in a ratio of about 9.0:1.0.

PREPARATION EXAMPLE 10

Production of three units copolymer of 3-chloro-9-vinylcarbazole, 9-vinylcarbazole and n-butyl methacrylate 3-chloro-9-vinylcarbazole 0.5 gr., 9-vinylcarbazole 1.0 gr. and methacrylic butyl 0.15 gr. were dissolved in methylene chloride, and were polymerized in nitrogen atmosphere in the presence of azoisobutylonitrile. A white polymer 1.3 gr. was obtained by the repetition of dissolution and recrystallization in chlorobenzene-methanol. From analysis and infrared absorption data, this product was recognized as copolymer of chlorovinylcarbazole, vinylcarbazole and butyl methacrylate in a ratio of about 3.1:10:1.

PREPARATION EXAMPLE 11

Production of poly-3,6-dichloro-9-vinylcarbazole

A polymerization tube substituted with nitrogen contained 3,6-dichloro-9-vinylcarbazole 1.0 gr. and was heated at 120° C. for 3 hours. The reaction mixture was dissolved in chlorobenzene and deposited in methanol. The resultant was a white polymer 0.8 gr., the yield; about 80%. The characteristic viscosity in benzene was $[\eta]=0.055$.

PREPARATION EXAMPLE 12

Production of copolymer of 3,6-dichloro-9-vinylcarbazole and 9-vinylcarbazole 3,6-dichlorocarbazole 0.6 gr. and 9-vinylcarbazole 1.0 gr. was contained in a polymerization tube substituted with nitrogen gas, and was heated at 120° C. for 6 hours. The reaction mixture was dissolved in benzene and deposited in methanol. Such procedure was twice repeated. The resultant was a white polymer 1.2 gr. From analysis of nitrogen and chlorine, this product was recognized as copolymer of chlorovinylcarbazole and vinylcarbazole in a ratio of about 1.0:2.5.

PREPARATION EXAMPLE 13

Production of poly-1,3,6-trichloro-9-vinylcarbazole

Carbazole 16.7 gr. was suspended in chloroform 200 ml. followed by adding sulfurylchloride 43 gr. and was heated with reflux. After cooled, a crystalline was deposited, and recrystallized in chlorobenzene to obtain 1,3,6-trichlorocarbazole. This product melts at 180° C.

For modification, such chlorinization can be accomplished by reacting carbazole with a predetermined amount of chlorine gas in a glacial acetic acid.

*Analysis*.—Calculated for 1,3,6-trichloro-9-vinylcarbazole (percent): N, 4.72; Cl, 35.9. Found (percent): N, 4.70; Cl, 34.5.

1,3,6-trichloro-vinylcarbazole was dissolved into 1,2-dichloroethanol in nitrogen atmosphere. The polymerization was carried out in the presence of benzoyl peroxide with stirring for 8 hours to produce poly-1,3,6-trichloro-9-vinylcarbazole. This polymer was in polymerization degree of about 50%, soluble in chlorobenzene and insoluble in benzene.

PREPARATION EXAMPLE 14

Poly-9-vinylcarbazole (commercially available under trade name Luvican M–170 from BASF) 4.0 gr. was dissolved into dried benzene 100 cc. and thereto a 20% solution of sulfuryl chloride 0.7 gr. in benzene was dropwise added at 0° C. with stirring. Then, after stirring at same temperature for 3 hours, nitrogen gas was blown into the reaction mixture from a nitrogen introduction tube for 2 hours. The provided solution can be used for coating material in use for the production of photosensitive plate.

In the following, there will be mentioned the effect and behavior of the electrophotographic photosensitive material of the polymer of this invention as prepared above.

Heretofore, organic photoconductive materials have attracted attention and many compounds have been reported, and various compounds of complicated chemical structure, polymer-type aromatic compounds, and heterocyclic compounds have been intensely studied. As the result, some organic photosensitive compounds having fairly high sensitivity have been reported. Further, sensitization processes have been recently studied to increase the sensitization. This tendency is due to the fact that organic photoconductive materials of the highest sensitivity known today still cannot be practically used without applying sensitizing treatment. Therefore, it is inevitable to select and use an effective photosensitive means in the art of organic photosensitive materials.

As the sensitizing methods, there are used coloring matter sensitization and Lewis acid sensitization without fail. In addition, free radical sensitization means may also be used which can remarkably sensitize organic photoconductive materials to such an extent that the resulting photoscensitivity is the same as or higher than that of zinc oxide and selenium.

The theoretical background of sensitizing effect is considered as follows. Coloring matter sensitization is to impart a spectrum absorption characteristic of coloring matter to organic photoconductive materials, and Lewis acid sensitization attributes to formation of complex of donor and acceptor between Lewis acid and organic photoconductive material. Further, sensitization effect of free radical sensitizing means is due to structure senitizing effect caused by partially formed sensitizing center caused by active free radical formed by applying radiation energy.

Thus, commercial value of organic photoconductive materials depends upon the degree of sensitization up to which the organic photoconductive material can be sensitized.

The chlorine substituted poly-9-vinylcarbazole has a high photosensitivity and, moreover, can be remarkably sensitized by sensitization means to give an organic photoconductive material of high sensitivity, easy handling and high stability, which is far more excellent than that of conventional organic photoconductive materials. Furthermore, when the organic photoconductive material is subjected to free radical sensitization, the photosensitivity of the resulting organic photoconductive material is the same as or higher than that of zinc oxide material sensitized by coloring matter.

Heretofore, as organic photoconductive materials, bromine or iodine substituted polyvinyl carbazole has been known, but these polymers are not excellent in solubility, and when the degree of halogenation is increased so as to increase the sensitivity, the solubility of the resulting polymer is lowered. Therefore, selection of solvents upon producing a film is very difficult. In addition, the degree of halogenation of these polymers, i.e. brominated or iodinated polymer, is at most 2 halogen atoms per one carbazole ring. With respect to bromine substituted 9-vinylcarbazole, the higher the bromine content, the higher the photosensitivity, but the maximum bromine atoms are two per one carbazole ring. Therefore, a bromine substituted poly-9-vinylcarbazole having maximum sensitivity to be expected can not be obtained. When a free radical sensitization means is applied, the sensitivity in the visible region is rather decreased, and particularly such tendency increases as the degree of bromination and iodination increases. Thus, iodination or bromination of poly-9-vinylcarbazole can improve the photosensitivity of each polymer itself, but there is trouble upon applying sensitizing means, particularly free radical sensitization effect which is one of the most powerful methods can not be applied. This defect is a fatal one in practical use. When the degree of substitution is high bromine substituted poly-9-vinylcarbazole is liable to heat and debromination reaction is apt to occur upon long time storage and the commercial value is low.

On the contrary, the polymer containing chlorine substituted 9-vinylcarbazole repeating unit of this invention has the following various advantages.

The intrinsic spectrum sensitivity is larger than that of poly-9-vinylcarbazole, bromine substituted 9-vinylcarbazole, or iodine substituted poly-9-vinylcarbazole. This is due to the large electronegativity of chlorine as compared with that of bromine and iodine, and chlorine can polarize conjugated π electron to a great extent and the electron having free electron character contributes to the increase of the photoconductivity, or the stronger intramolecular action of donor-acceptor type of chlorine than that of bromine or iodine contributes to the increase of photoconductivity.

The following are comparison examples.

COMPARISON EXAMPLE 1

To a polyethylene terephthalate base film was applied a solution having the following composition by using a rotary coating machine followed by warm air blowing to dry the coating.

Poly-9-vinylcarbazole containing halogen atoms as shown in a table below—2.0 g.
Chlorobenzene—40 ml.

The photosensitive film thus prepared was negatively charge by using a rotary electrometer, exposed to a 100 w. high pressure mercury lamp. A reciprocal of exposure time required for decrease of potential to ⅓ is used as an index of specific sensitivity to compare the photosensitivity. The result is shown in the table below.

| Sample | Halogen content | | | | | | |
|---|---|---|---|---|---|---|---|
| | 0.25 | 0.5 | 1.0 | 1.5 | 2.0 | 3.0 | 4.0 |
| Chlorine | 203 | 214 | 229 | 240 | 255 | 269 | 290 |
| Bromine | 136 | 144 | 154 | 167 | 181 | | |

The "Halogen content" in the table is a number of a halogen atom per one mole of vinylcarbazole repeating unit, and "Chlorine" and "Bromine" represent "chlorine substituted polyvinylcarbazole" and "bromine substituted poly-9-vinylcarbazole," respectively. The value in the table is a specific sensitivity determined by assuming the specific sensitivity of poly-9-vinylcarbazole as 100. The column where an oblique line is drawn represents that the corresponding compound cannot be obtained.

As is clear from the above table, chlorination of poly-9-vinylcarbazole can be effected to a larger extent and the increase of degree of chlorination results in increase in sensitivity.

When chlorine substituted poly-9-vinylcarbazole is subjected to a free radical sensitizing means, an excellent photosensitive material of high sensitivity can be obtained. The higher the degree of chlorination, the higher the sensitivity. When the degree of chlorination is extremely high, a disadvantage of lowering the surface potential due to dark decay. However, as a whole, chlorine substituted poly-9-vinylcarbazole is far better than bromine substituted as photosensitive material. This will be shown by the following Comparison Example 2.

COMPARISON EXAMPLE 2

Halogen substituted poly-9-vinylcarbazole as shown in a table below—2.0 g.
Carbon tetrabromide—100 mg.
Vinylcarbazole—100 mg.
Chlorobenzene—40 ml.

A solution having the above-mentioned composition was placed in an Erlenmeyer flask of hard glass, and exposed to a 100 w. high pressure mercury lamp at a distance of 10 cm. for 5 minutes with stirring to effect a photochemical treatment. Then, the resulting solution was applied to a polyethylene terephthalate base film to form a photosensitive film. The specific sensitivity was determined under the same conditions as in Comparison Example 1. The specific sensitivity was determined by assuming that of poly-9-vinylcarbazole as 100. The exposure light source in this determination was a 60 w. tungsten lamp. The results are listed in the table below.

| Sample | Halogen content | | | | | | |
|---|---|---|---|---|---|---|---|
| | 0.25 | 0.5 | 1.0 | 1.5 | 2.0 | 3.0 | 4.0 |
| Chlorine | 128 | 137 | 135 | 161 | 169 | 180 | 183 |
| Bromine | 91 | 79 | 43 | 20 | 14 | | |

"Halogen Content," "Chlorine," "Bromine" and the oblique line have the same meaning as in Comparison Example 1.

As is clear from the above table, the free radical sensitizing treatment is rather disadvantageous to bromine substituted poly-9-vinylcarbazole, that is, the sensitivity is lowered by the treatment. On the contrary, chlorine acts as an effective agent to increase the sensitivity.

Furthermore, solubility of chlorine substituted poly-9-vinylcarbazole in solvents is excellent and even if three to four chlorine atoms per one vinylcarbazole ring are introduced, the solubility is not lowered. Therefore, the production of photosensitive film is easy. In addition, the adherability to a base film is excellent and the physical properties are also favorable.

Production of electrophotographic photosensitive material from the above mentioned polymers may be carried out by coating the polymer solution to an electroconductive support followed by drying, or by melt-coating the polymer to an electroconductive support, or by forming a self-supporting film from the polymer solution or by extrusion of the polymer.

The above-mentioned polymers are made into a self-supporting matter in a form of film or textile, or coated as thin film on an electroconductive support to produce electrophotographic photosensitive materials. For example, a polymer solution was coated on a glass plate, dried and peeled and the polymer melt is extruded through a nozzle to form fibers, which are then woven.

To the polymer there may be added various additives such as sensitizers for controlling photographic characteristics, plasticizers, opaque-rendering agent for controlling physical properties.

As sensitizers, there may be used Lewis acid sensitizers, for example, polynitro compounds such as 1,3,5-trinitrobenzene, picric acid, 5-nitroacenaphthene and 2,4,7-trinitrofluorenone, carboxylic acids such as acetic acid, trifluoroacetic acid, trichloroacetic acid and salicylic acid, sulfonic acids such as benzene sulfonic acid, p-toluene sulfonic acid and sulfonic acid chloride such as p-toluenesulfonyl chloride, and optical sensitizers, for example, Crystal Violet, Malachite Green, Methylene Blue, Brilliant Green, Methylene Blue, and Quinizaline.

As plasticizers, there may be used dibutylphthalate, dioctylphthalate, tricresylphosphate and polyphenyl chloride.

To the above mentioned polymers a free radical sensitizing method by using free radical formers is very useful. The free radical sensitizing methods are disclosed in Japanese patent application No. 68671/1968 and Japanese patent application No. 68533/1968. They disclose processes for preparing electrophotographic photosensitive plate remarkably sensitized by applying a radiation energy to a photoconductive material in the presence of free radical former, if desired, additionally aromatic amines and leuco base of coloring matter. When photoconductive materials of this invention are subjected to the above-mentioned free radical sensitizing procedure, very excellent electrophotographic photosensitive plates are obtained.

Free radical formers particularly useful for chlorine substituted poly-9-vinylcarbazole may be polyhalogen compounds such as iodoform, carbon tetrabromide, bromoform, bromotrichloromethane, and hexachloroethane.

As aromatic amines, there may be mentioned 9-vinylcarbazole, 3-chloro-9-vinylcarbazole, 3 - bromo - 9 - vinylcarbazole, diphenylamine, and triphenylamine.

As leuco base of coloring matter, there may be mentioned leuco Malachite Green and leuco Crystal Violet.

These components are dissolved in benzene and monochlorobenzene and exposed to a light such as a high pressure mercury lamp. The polymer solution thus obtained is applied to an aluminum plate, paper and film followed by drying to form a photosensitive plate.

The free radical sensitizing method, if desired, may be employed together with conventional optical sensitizing methods and Lewis acid sensitizing methods.

The radiation energy source used in this invention is appropriately selected depending upon free radical formers and solvents used together. Any radiation energy capable of activating a free radical former to produce free radicals in the sensitizing treatment system. For example, a light source emitting a large amount of ultraviolet ray or near ultraviolet ray such as mercury lamp (low pressure, high pressure, or super high pressure), metal halide lamp, and xenon lamp, is preferable.

The amount of free radical former in this invention preferably range from one to 30% by weight, but is not limited to such range.

The electrophotographic photosensitive material prepared according to this invention can be used for forming images by conventional charging and developing procedures, i.e. corona discharging, magnetic brush development, electrophoresis.

Photosensitivity of chlorine substituted poly-9-vinylcarbazole obtained by chlorinating poly-9-vinylcarbazole varies largely depending upon degree of chlorination, i.e. chlorine content. The photosensitivity also varies depending upon sensitizing methods applied thereto.

The relation among sensitizing method, chlorine content and photosensitivity is shown below as is clear from examples appearing later.

(1) When Lewis acid sensitization, optical sensitization or combination thereof is employed, a chlorine content of 8–43%, particularly 15–30%, is preferable. It is difficult to synthesize the polymer containing chlorine more than 43%.

(2) In case of free radical sensitization, a chlorine content of 2–28% is suitable. When chlorine content exceeds 28%, the surface potential is remarkably lowered and sometimes a desired contrast of image is not obtained. However, even if chlorine content exceeds 28%, the polymer can be used as a satisfactory phtosensitive material by applying free radical sensitization thereto in the presence of an organic metal compound. For example, chlorine substituted poly-9-vinylcarbazole containing about 40% chlorine can have high photosensitivity by the above mentioned treatment.

The invention will be further illustrated by reference to the following specific examples:

EXAMPLE 1

An aluminum plate having rough surface was defatted with a mixture of ether and alcohol and dried and then the following solution was applied to the rough surface of aluminum plate by using a rotary coating machine so as to form a film of 8 microns in thickness and dried with warm air.

Poly-9-vinylcarbazole (Luvican M–170, trade name, supplied by BASF) as control, or photoconductive polymer—2.0 g.
Chlorobenzene—40 ml.
Crystal Violet—2.0 mg.

The resulting photosentive plate was negatively charged by attaching to a rotary type electrometer, exposed to a tungsten lamp. The reciprocal of exposing itme required for decreasing the potential to ⅓ and ¹⁄₁₀ is used as an index of sensitivity to compare photosensitivity of the materials. The result is shown below. The initial potential when the exposure starts was about 500 volts for each sample.

| Polymer | Specific sensitivity | |
|---|---|---|
| | For ⅓ decrease | For ¹⁄₁₀ decrease |
| (1) Poly-9-vinylcarbazole (Luvican M–170) (as reference) | 1.00 | 1.00 |
| (2) Chlorine substituted poly-9-vinylcarbazole (Cl content 4.25%) | 2.10 | 2.50 |
| (3) Chlorine substituted poly-9-vinylcarbazole (Cl content 8.40%) | 5.25 | 5.84 |
| (4) Chlorine substituted poly-9-vinylcarbazole (Cl content 15.2%) | 8.72 | 10.3 |
| (5) Chlorine substituted poly-9-vinylcarbazole (Cl content 27.8%) | 10.5 | 15.0 |
| (6) Chlorine substituted poly-9-vinylcarbazole (Cl content 35.0%) | 11.2 | 16.4 |
| (7) Chlorine substituted poly-9-vinylcarbazole (Cl content 43.0%) | 12.0 | 17.2 |

EXAMPLE 2

To a polyethylene terephthalate film of 90 microns in thickness was applied a solution of cuprous iodide (4 g.) in 150 ml. of acetonitrile to which 30 ml. of a 5% solution of polyvinylformal and the resulting coating was dried to impart electroconductivity to the surface of the film.

Then, a solution of the following composition was applied to the surface so as to form a film of 10 microns thick after drying.

Chlorine substituted-poly-9-vinylcarbazole (chlorine content 27.8%)—2 g.
Chlorobenzene—40ml.
Diphenylamine Blue—5 mg.
2,4,7-trinitrofluorenone—2 mg.
Diphenyl chloride—0.5 g.

The resulting film was negatively charged at a dark place by a corona charging device and then exposed to a positive microfilm original by using a photographic enlarger equipped with a 500 w. tungsten lamp. The development was carried out by dipping the film in a liquid developer to produce a clear positive image. The optimum exposure amount was 100 lux. sec.

EXAMPLE 3

To a surface of a bond paper (6 g./m.$^2$) having a polyvinylalcohol layer was applied a photosensitive solution so as to form a coating of 8 microns in thickness after drying. The photosensitive solution was prepared by dissolving 2.0 g. of chlorine substituted poly-9-vinylcarbazole in 40 ml. of chlorobenzene, adding thereto 100 mg. of carbon tetrabromide and 100 mg. of 9-vinylcarbazole, placing the resulting solution in an Erlenmeyer flask of hard glass, and applying a photochemical reaction treatment for 5 minutes at a distance of 10 cm. by a 100 w. high pressure mercury lamp with stirring.

A remarkable absorption appeared at the visible spectrum region with respect to samples containing from 2.0 to 4.8% chlorine.

Samples containing chlorine higher than 10% gave a weak absorption. Then, to this solution was added 1 mg. of 2,4,7-trinitrofluorenone and 1 mg. of Crystal Violet to prepare a photosensitive solution.

The photosensitive paper thus obtained was charged at a dark place and exposed to a positive microfilm original by using a photographic enlarger equipped with a 500 w. tungsten lamp. The resulting latent image was developed with a liquid developer to give a positive image.

| Chlorine content of chlorine substituted poly-9-vinylcarbazole | Optimum exposure amount, lux.sec. | Image quality |
|---|---|---|
| Poly-9-vinylcarbazole (Luvican M-170) (as reference). | 144 | Density of image is high, but some fog is observed. |
| 2.10% | 130 | Image of high density; no fog. |
| 8.40% | 98 | Ibid. |
| 15.2% | 90 | Density of image is somewhat decreased. |
| 32.5% | 95 | Density of image is decreased and the contrast is lowered. |

EXAMPLE 4

Chlorine substituted poly-9- vinylcarbazole (chlorine content 27.8%)—2 g.
Carbon tetrabromide—100 mg.
Triphenyl bismutin (Reagent, supplied Tokyo Kasei)—2 mg.
Monochlorobenzene—40 ml.

A solution having the above composition was subjected to a photochemical reaction under the same conditions as in Example 3. Appearance of absorption at the visible spectrum region was more than in Example 3 with respect to samples having the same chlorine content. Then, 2 mg. of Crystal Violet was added to give a photosensitive paper.

When a reproducing test was effected under the same conditions as in Example 3, a high contrast copy was obtained at an optimal exposure amount of 100 lux. sec.

The solution containing triphenylbismutin according to the example is particularly effective when applied to a chlorine substituted poly-9-vinylcarbazole of high chlorine content. For example, when the chlorine content was 15.2%, an almost similar result was obtained.

This example can be effected by using various organo metallic compound, for example, aryl metal compound other than triphenylbismutin, such as tetraphenyl tin, triphenyl tin chloride, tetraphenyl lead, triphenyl boron, triphenyl arsine, and p-trimercurichloride.

EXAMPLE 5

A rough surface of an aluminum plate was defatted with a mixture of ether and alcohol, dried and coated with a solution of the following composition by using a rotary coating device so as to produce a film of 4 microns in thickness after drying, and dried with warm air.

Poly-9-vinylcarbazole (Luvican M-170, trade name, supplied by BASF) as reference) or photoconductive polymer of this invention—2.0 g.
Chlorobenze—40 ml. (The volume may be varied depending upon each particular polymer.)
2,4,7-trinitrofluorenone—1.0 mg.

The resulting photosensitive plate was negatively charged by a rotary type electrometer, exposed to a tungsten lamp. The reciprocal of exposing time required for decreasing the potential to ⅓ and ⅒ is used as an index of sensitivity to compare photosensitivity of the materials. The initial potential when the exposure starts was about 500 volts for each sample.

| Polymer | Specific sensitivity For ⅓ decay | For ⅒ decay |
|---|---|---|
| (1) Poly-9-vinylcarbazole (Luvican M-170) (as reference) | 1.00 | 1.00 |
| (2) Poly-3-chloro-9-vinylcarbazole (prepared by Preparation Example 7(1)) | 4.55 | 5.20 |
| (3) Copolymer of 3-chloro-9-vinylcarbazole with 9-vinylcarbazole (prepared by Preparation Example 8) | 1.80 | 2.50 |
| (4) Copolymer of 3-chloro-9-vinylcarbazole with styrene (prepared by Preparation Example 9) | 2.80 | 3.10 |
| (5) Poly-3,6-dichloro-9-vinylcarbazole (prepared by Preparation Example 11) | 10.5 | 15.0 |

EXAMPLE 6

To a polyethylene terephthalate film of 90 microns in thickness was applied a solution of cuprous iodide (4 g.) in 150 ml. of acetonitrile to which 30 ml. of a 5% solution of polyvinylformal and dried to impart electroconductivity to the surface of the film.

A solution having the following composition was then applied to the surface to form a film of 4 microns in thickness after drying.

Poly-3-chloro-9-vinylcarbazole prepared according to Preparation Example 7(1)—2 g.
Chlorobenzene—40 ml.
Diphenylamine Blue—5 mg.

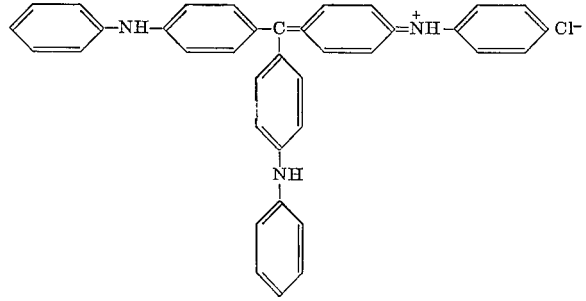

2,4,7-trinitrofluorenone—2 mg.
Diphenyl chloride—0.2 g.

The resulting film was negatively charged in a dark place by using a corona charging device and then exposed to a positive microfilm original by using a photographic enlarger equipped with a 500 w. tungsten lamp. The film thus exposed was dipped in a liquid comprising carbon black was dispersed in a high boiling point petroleum solvent to produce a clear positive image. The optimum exposure amount was 100 luxsec.

EXAMPLE 7

Two grams of a copolymer of 3-chloro-9-vinylcarbazole with 9-vinylcarbazole prepared according to Preparation Example 8 was dissolved in 40 ml. of chlorobenzene. Carbon tetrabromide (100 mg.) was added thereto. The resulting solution was placed in a flask of hard glass and exposed to a 100 w. high pressure mercury lamp at a distance of 10 cm. with stirring. After 20 minutes, to the resulting solution were added 1.0 mg. of 2,4,7-trinitrofluorenone and 1.0 mg. of Crystal Violet. The mixture thus obtained was applied to a polyethylene terephthalate film having an electroconductive layer as in example and dried. This film gave an excellent image at an exposure amount of about 220 lu. sec. by electrophoresis development for negative charging and positive image, and at an exposure amount of about 200 lux. sec. for positive charging and positive image.

When the above procedure was followed by using bromo-form, iodoform or broncotrichloro-methane in place of carbon tetrabromide, almost similar results were obtained.

What is claimed is:

1. An electrphotographic photosensitive material which comprises a polymer containing a chlorine substituted 9-vinyl carbazole repeating unit.

2. An electrophotographic photosensitive material according to claim 1 in which the polymer is chlorine substituted poly-9-vinyl-carbazole containing 2–43% by weight of chlorine.

3. An electrophotographic photosensitive material according to claim 2 in which the chlorine substiuted poly-9-vinylcarbazole is that obtained by chlorinating poly-9-vinyl carbazole.

4. An electrophotographic photosensitive material according to claim 2 in which the chlorine substituted poly-9-vinylcarbazole is that obtained by polymerizing a chlorine substituted 9-vinylcarbazole.

5. An electrophotographic photosensitive material according to claim 4 in which the chlorine substituted 9-vinyl carbazole is at least monochloro substituted dichloro substituted or trichloro substituted.

6. An electrophotographic photosensitive material according to claim 5 in which the monochloro substituted 9-vinyl-carbazole is 3-chloro-9-vinyl-carbazole.

7. An electrophotographic photosensitive material according to claim 5 in which the dichloro substituted 9-vinyl-carbazole is 3,6-dichloro-9-vinyl carbazole or 1,3-dichloro-9-vinyl carbazole.

8. An electrophotographic photosensitive material according to claim 5 in which the trichloro substituted 9-vinyl-carbazole is 1,3-6-trichloro-9-vinyl carbazole.

9. An electrophotographic photosensitive material according to claim 1 in which the polymer is a copolymer of a chlorine substituted 9-vinyl carbazole with at least one other vinyl monomer.

10. An electrophotographic photosensitive material according to claim 9 in which the vinyl monomer is styrene.

11. An electrophotographic photosensitive material according to claim 9 in which the vinyl monomer is 9-vinyl-carbazole.

12. An electrophotographic photosensitive material according to claim 9 in which the vinyl monomer is styrene and 9-vinyl carbazole.

13. An electrophotographic photosensitive material according to claim 9 in which the chlorine substituted 9-vinylcarbazole is at least monochlono substituted dichloro substituted or trichloro substituted.

14. An electrophotographic photosensitive material according to claim 1 in which a sensitizing agent is added to the polymer.

15. An electrophotographic photosensitive material according to claim 14 in which the sensitizing agent is a dye sensitizer.

16. An electrophotographic photosensitive material according to claim 14 in which the sensitizing agent is a Lewis acid.

17. An electrophotographic photosensitive material according to claim 14 in which the sensitizing agent is a combination of a dye sensitizer and a Lewis acid.

18. An electrophotographic photosensitive material according to claim 14 in which the polymer is a chlorine substituted poly-9-vinylcarbazole containing 8–43% by weight of chlorine.

19. An electrophotographic photosensitive material which comprises a polymer having a chlorine substituted 9-vinylcarbazole repeating unit subjected to a photochemical reaction treatment by applying a radiation energy thereto in the presence of a free radical former capable of producing a free radical upon irradiation.

20. An electrophotographic photosensitive material according to claim 19 in which a sensitizing agent is added thereto.

21. An electrophotographic photosensitive material according to claim 19 in which the polymer is a chlorine substituted poly-9-vinylcarbazole containing 2–28% by weight of chlorine.

22. An electrophotographic photosensitive material according to claim 19 in which an organo metallic compound is added thereto.

23. An electrophotographic photosensitive material according to claim 22 in which the polymer is a chlorine substituted polyvinylcarbazole containing 15–43% by weight.

24. A process for preparing chlorine substituted poly-9-vinylcarbazole which comprises chlorinating poly-9-vinylcarbazole in a solvent with sulfuryl chloride or chlorine gas.

25. A process according to claim 24 in which the resulting chlorine substituted poly-9-vinylcarbazole contains 2–43% by weight of chlorine.

26. A process according to claim 24 in which the solvent is a halogenated hydrocarbon.

27. A process according to claim 26 in which the halogenated hydrocarbon is at least one member selected from the group consisting of methylene chloride, 1,2-dichloro ethane, sym-tetrachloro ethane, chlorobenzene, and dichlorobenzene.

28. A process according to claim 24 in which the solvent is benzene.

References Cited

UNITED STATES PATENTS

| | | | |
|---|---|---|---|
| 3,287,123 | 11/1966 | Hoegl | 96—1.5 |
| 3,421,891 | 1/1969 | Inami et al. | 96—1.6 |
| 3,484,237 | 12/1969 | Shattuck et al. | 96—1.5 |
| 3,526,502 | 9/1970 | Murakami et al. | 96—1.5 |

GEORGE F. LESMES, Primary Examiner

M. B. WITTENBERG, Assistant Examiner

U.S. Cl. X.R.

96—1.6; 260—80.3 R, 88.1 PA, 80.72, 88.3 R, 315